Oct. 11, 1960   B. O. WEINSCHEL   2,956,243
REGULATED SOURCE OF HIGH-FREQUENCY ENERGY
Filed May 28, 1958   4 Sheets—Sheet 1

INVENTOR
BRUNO O. WEINSCHEL

INVENTOR
BRUNO O. WEINSCHEL

Oct. 11, 1960   B. O. WEINSCHEL   2,956,243
REGULATED SOURCE OF HIGH-FREQUENCY ENERGY
Filed May 28, 1958   4 Sheets—Sheet 4

INVENTOR
BRUNO O. WEINSCHEL

United States Patent Office 2,956,243
Patented Oct. 11, 1960

2,956,243

REGULATED SOURCE OF HIGH-FREQUENCY ENERGY

Bruno O. Weinschel, 6900 Marbury Drive, Bethesda, Md.

Filed May 28, 1958, Ser. No. 738,399

6 Claims. (Cl. 331—183)

This invention relates to a new and novel regulated source of high-frequency energy.

It is an object of the present invention to provide a new and novel modulated RF power source which has extreme frequency stability and excellent amplitude.

It is a further object of this invention to provide a new and novel modulated RF power source whose output is independent of any load impedance including fluctuations in temperature, line, etc.

It is a further object of the present invention to provide a new and novel modulated RF power source which has highly stable internal modulation.

It is a further object of this invention to provide a novel modulated RF power source which does not require a padding attenuator by virtue of an output regulator circuit that acts to maintain constant incident power independent of the load, thereby allowing use of the full generator output for precision measurements.

The novel modulated RF power source is particularly well suited for use as a source of high frequency energy in the frequency range from 50 to 2000 megacycles but it is to be understood that the principles herein explained are applicable to frequencies above and below this range.

The novel modulated RF power source of high frequency energy may be used with auxiliary equipment, well-known in the prior art, to maintain the output voltage or current constant in a selected reference plane or, if desired, to maintain a constant amplitude wave incident upon the load, independent of any load impedance.

With the foregoing and various other objects, features and results in view which will be readily apparent from the following detailed description and explanation, the invention consists in certain novel features in design, operation, construction and combinations as will be fully referred to and specified hereinafter.

Referring to the accompanying drawings in which similar reference characters refer to corresponding parts and elements throughout the several figures thereof:

Figure 5:
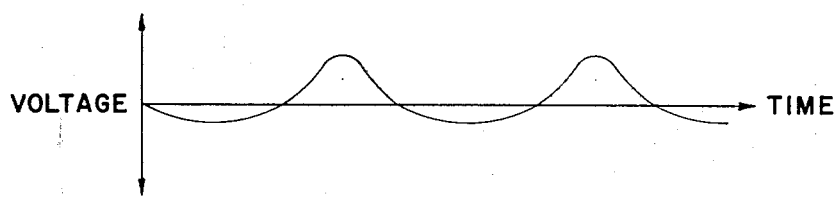

Fig. 5 discloses the wave form at one stage in the circuit.

Figure 1:
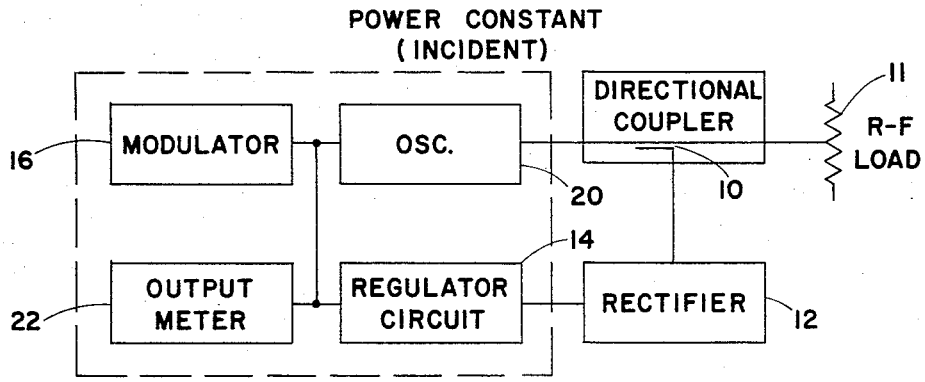
Fig. 1 is a block diagram of the novel high-frequency energy source as used to maintain constant incident power.

Before considering the novel RF modulated power source of high-frequency energy, let us first consider the auxiliary equipment to be used. The auxiliary equipment requires consideration of the quantity which is desired to be kept constant. For example, to maintain a constant incident or forward power upon the load, a directional coupler and rectifier are required. Fig. 1 shows one form of such an arrangement. The directional coupler 10 and rectifier 12 are arranged in the usual way so that the rectified voltage appearing across the rectifier 12 is proportional to the incident or forward power going to the load. This rectified voltage is coupled back into the modulated source where it is amplified in the regulator circuit 14 and fed back into the modulator 16 in the proper sense so that if the rectified voltage increases, the modulator and hence the RF output will be reduced. If the feedback loop gain is sufficient, such an arrangement can hold the incident power going to the load to a very accurate constant even with variations in the load.

Figure 2:
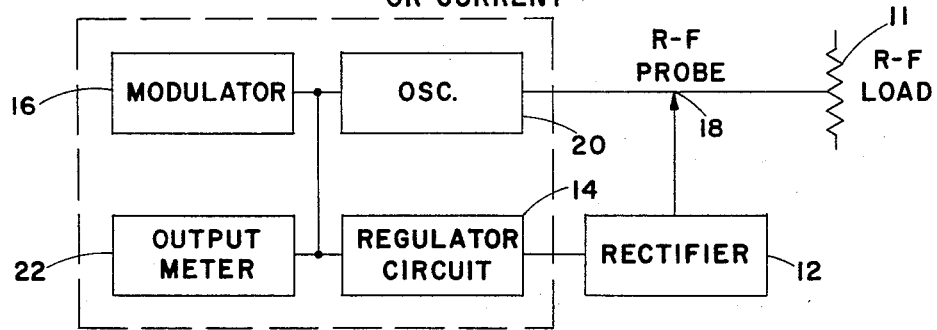
Fig. 2 is a block diagram of the novel high-frequency energy source as used to maintain constant voltage or current at a point on the transmission line.

If it is desired that the voltage or current in a particular reference plane along the transmission line be held constant, a similar arrangement is used. However, the rectifier 12 is coupled to the line in a different manner. A voltage or current probe 18 in a slotted line can be used as a reference. Fig. 2 discloses such an arrangement. In this case, the voltage or current would be maintained constant at the position of the probe 18 and at all reference planes removed from the probe 18 by integral multiples of one-half wavelength along the line. Thus by this arrangement if the load is positioned one-half wavelength along the line or an integral multiple of one-half wavelength along the line either the current or voltage passing to the load can be accurately determined. The directional coupler 10, rectifier 12 and RF probe 18 are all individually old and well-known in the microwave art.

Figure 3:
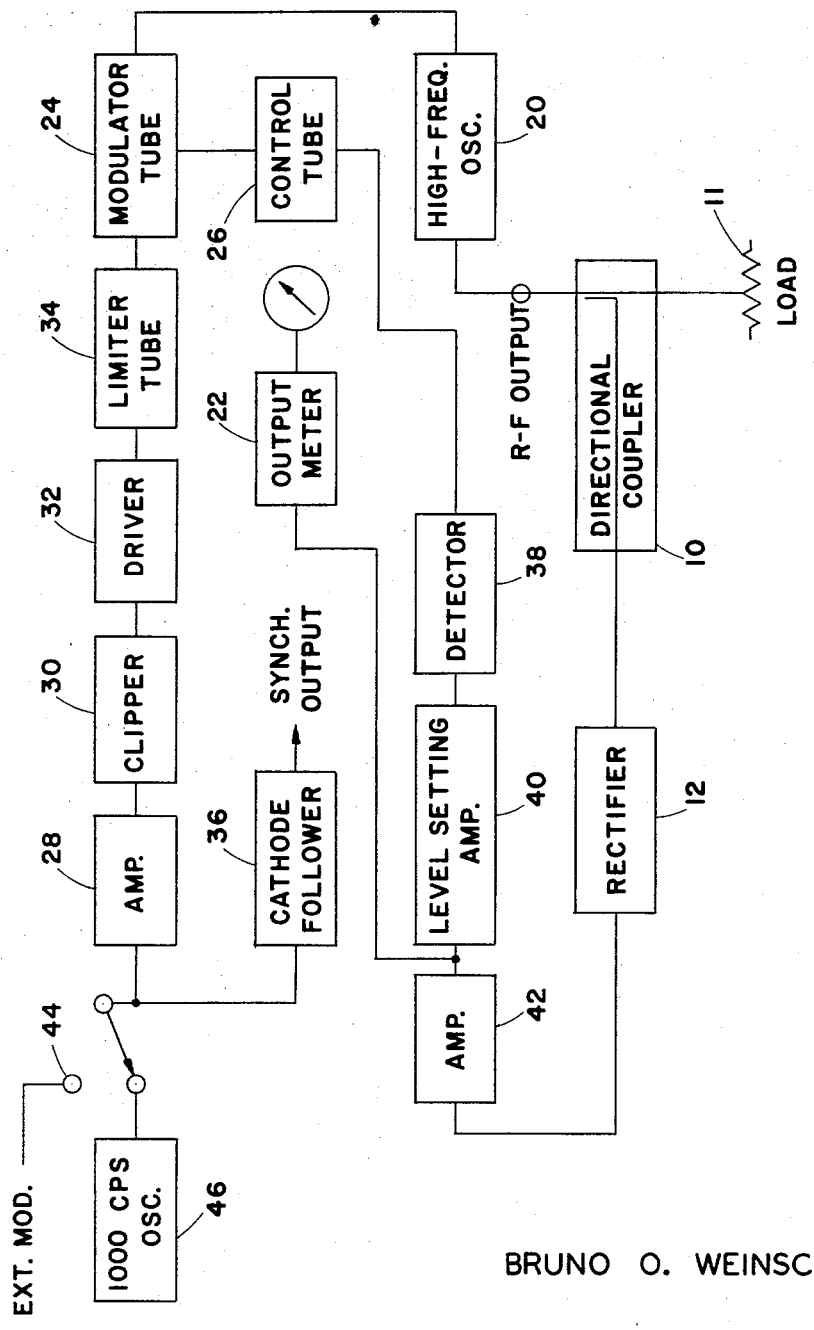
Fig. 3 is a block diagram of the novel modulator.

The RF source now to be described is a modulator containing the necessary circuitry to develop a square wave to 100% modulate the oscillator. This can be developed in the preferred embodiment from a 5 volt externally applied sinusoidal signal 44 or from a 1000 cycle per second internally generated signal 46. See Fig. 3 of the drawings.

The component parts of the regulated source of high-frequency energy are shown within the dotted lines of Figs. 1 and 2. The modulator 16 is shown in greater detail in the block diagram of Fig. 3.

The regulated source of high-frequency energy consists of the following elements:

(1) A high frequency oscillator 20 which can be an RT 434 tube and associated oscillator circuitry well-known in the microwave art.

(2) A modulator system 16 consisting of a 5814 tube 24 and a 6 BQ 7-A tube 26 which operate in a novel way to introduce both the square wave modulation and the feedback correction as voltage modulation on the plate supply of the modulator tube and a stable 1000 cycle per second source from which the square waves are generated. This particular arrangement will be described in greater detail hereafter.

(3) A regulator circuit 14 for amplifying the signal received from the rectifier 12 or other monitoring device and deriving a suitable signal to be applied to the 6 BQ 7-A tube 26 to achieve corrective modification of the oscillator tube plate supply. This circuitry is novel and will also be described hereafter.

(4) An output monitoring circuit and meter 22 which indicates the level of the corrective signal sent back to the modulator 16 and oscillator 20 from either the directional coupler 10 or the RF probe 18. Since the output of the directional coupler 10 and the regulator circuit 14 is proportional to the oscillator 20 output such an output indicator is possible.

The modulator system 16 will now be described in detail. The purpose of the modulator system 16 is to vary the plate voltage in two ways. It is desired first to square wave modulate the plate voltage at a 1000 cycle rate in such a way that for half the 1000 cycle period, the voltage will be so low that oscillations will cease, while for the other half of the cycle the voltage will be maintained as a high steady fixed voltage, thus supporting a constant oscillation. Second, it is desired that this high steady voltage be modified in accordance with the feedback signal from the rectifier 12 so as to maintain a constant monitoring rectifier output.

Figure 4A:
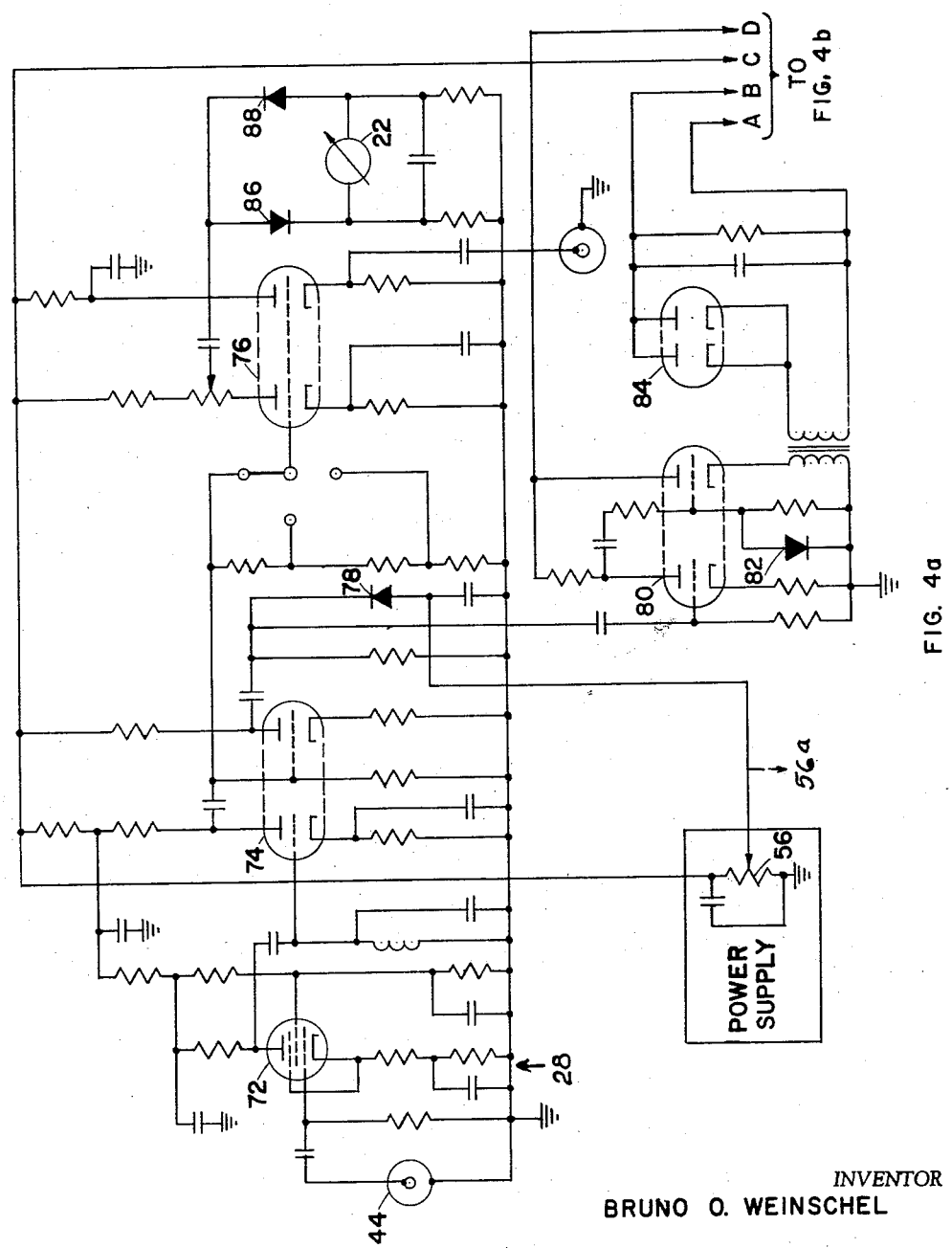
Figs. 4a and 4b are circuit diagrams of the novel modulator.
Figure 4B:
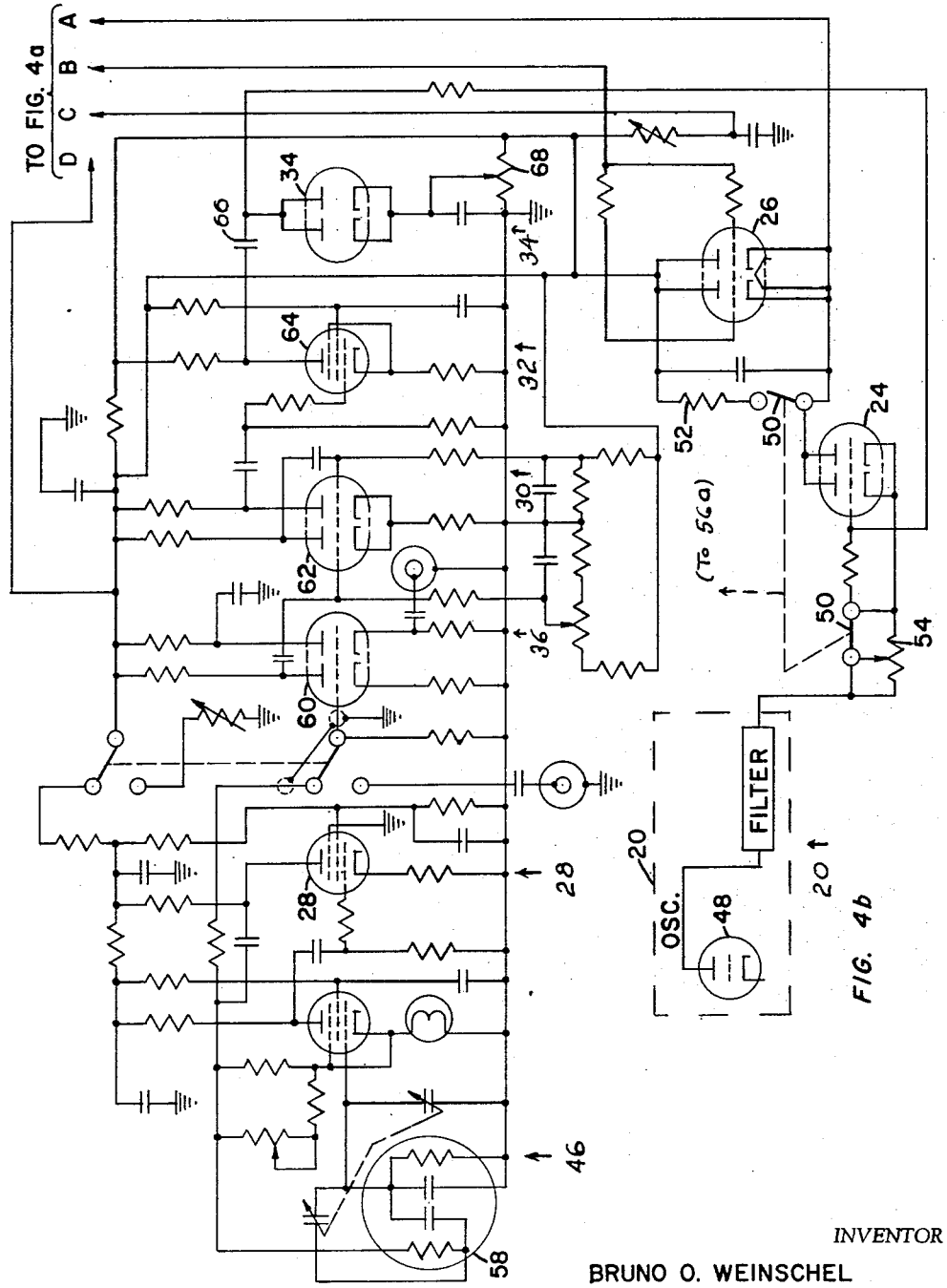

The manner in which this is achieved is to set two vacuum tubes 24 and 26 in series with the plate supply of the oscillator. See Figs. 3 and 4 of the drawings. With the circuit arranged in this way, current from the plate supply must first flow through the control tube 26, which in the preferred embodiment is a 6BQ7-A whose grid to cathode voltage is controlled by the feedback signal from the directional coupler or RF probe. Second, current must flow through the modulator tube 24, which in the preferred embodiment is a 5814 tube. The grid to ground voltage of this tube is a square wave modulated at 1000 cycles. In the preferred embodiment, both the modulator tube 24 and the control tube 26 each consist of two triodes in a single envelope. Further, to handle the large current of the oscillator 20, the two triodes are used in parallel in both cases.

Consider now the action of the modulator tube 24. When the square wave modulating signal is at its extreme negative excursion, tube 24 is effectively cut off and no current flows to the plate of the oscillator tube 48. See Fig. 4. When the square wave modulating signal is at its extreme positive excursion, the voltage drop across the modulator tube 24 is small. There is some current flow from grid to cathode, but the cathode potential is essentially controlled by the plate potential. This plate potential, it will be noted, is the same as the cathode potential of the control tube 26, and therefore depends upon the voltage drop across this tube. This voltage drop depends upon the grid to cathode potential of control tube 26 which is controlled by the feedback signal. Thus during that half of the 1000 cycle signal when the plate voltage is applied to the oscillator 20, it is controlled by the monitor rectifier 12 through the feedback loop.

Provision has been made for switching out the feedback circuit and simultaneously manually controlling the output of oscillator 20, if this is desired. Switch 50 has been inserted in the circuit so that it can, if closed, bypass control tube 26 with a 1500 ohm resistor 52 so that the feedback control is no longer effective, and simultaneously inserts the 10,000 ohm potentiometer 54 for manual control of the plate voltage of the oscillator 20 and hence its RF output. Operated by the same shaft as potentiometer 54 is potentiometer 56 which controls the RF output of oscillator 20 when the feedback loop is operative in a manner which will be described hereafter.

The 1000 cycle per second oscillator 46 will now be considered. The 1000 cycle signal must be of very stable amplitude and frequency and is generated by a Wein bridge circuit 58. The 1000 cycle signal is then amplified by amplifier 28 and then goes to the grid of the twin triode 60, one triode of which provides further amplification before feeding the signal to the twin triode 62. The other triode of twin triode 60 is a cathode follower which provides a low impedance output that may be used externally for various purposes such as operation of external synchronous detectors. Note the schematic of Fig. 3. Clipper 30 is composed of twin triode 62 and is operated as a cathode coupled clipper circuit as described in The Proceedings of the I.R.E., volume 36, page 1136; September 1948, entitled "The Cathode Coupled Clipper Circuit," by L. A. Goldmutz and H. L. Krauss.

The output of the cathode coupled clipper circuit is a square wave which is further amplified by driver 32 which may be a 6136 tube in the preferred embodiment. This tube is shown as 64 in Fig. 4. After the square wave has been amplified by tube 64 it is coupled by condenser 66 to the plate of rectifier tube 34 and to the grid of modulator tube 24. The rectifier or limiter tube 34 and the resistance 68 are principally responsible for setting the potential of the upper edge of the square wave by charging condenser 66. However, modulator tube 24 also helps to hold this potential by drawing grid current through the output impedance of driver 32. The point at which modulator tube 24 draws grid current depends on its plate potential which is controlled by control tube 26. The lower edge of the square wave is maintained, in the preferred embodiment, at approximately 140 volts below the upper edge by the square wave amplitude.

The arrangement of driver 32, limiter 34 and modulator 24 constitutes a novel way of applying particularly stable square wave modulation to the plate of the oscillator tube 48 while at the same time allowing the amplitude control to reside in control tube 26 which is controlled independently.

Let us now consider the monitoring signal circuits. Because the RF output of the novel modulated RF source is square wave modulated the output of the rectifier 12 which is used for feedback will be a square wave. The monitoring signal circuit amplifies this signal at 42, rectifies it in a particular way, and applies this rectified signal to the grid of control tube 26. In order to achieve the desired regulation, it is necessary that the square wave, if below a pre-set amplitude, give no rectified output, and when above this pre-set value, give a large signal linearly proportional to the excess of its amplitude over the pre-set value. In this way, the pre-set value of square wave amplitude determines the level at which the rectifier 12 will operate and thus sets the output level of the modulator 16. This arrangement will now be described in detail.

The square wave monitoring signal enters the modulated RF energy source at point 44. See schematic of Fig. 4a. It is amplified in amplifier tube 72 and becomes a sine wave on the grid of tube 74 where harmonics are eliminated by a parallel resonant circuit. It is further amplified in the second section of tube 74 and applied to rectifier 78 and the grid of the meter amplifier 76, which will be discussed later. The potentiometer 56 sets the level at which rectification begins by biasing the rectifier 78. For signals of amplitude less than the bias voltage, rectifier 78 presents a low impedance. Whenever the peak of a signal exceeds the bias level provided by potentiometer 56 that peak sees a higher impedance. Thus the signal at the grid of tube 80 appears as shown in Fig. 5. The amplitude of this signal is in a sense proportional to the excess of the A.C. signal above the bias voltage; however, the sharpness is not good enough. For example, there is a small signal at the grid of tube 80 even when the input signal is small. The rectification must be further improved to give good regular performance. To accomplish this, the output of one section of tube 80, which is a twin triode, is coupled to the grid of the other section of tube 80. The rectifier 82 between grid and ground of the second section of tube 80 further flattens the negative part of the wave in Fig. 5 (positive at the grid of the second section of tube 80), so that the combined action of the two rectifiers gives a much sharper rectification action than one alone. The above feature contributes greatly to the control accuracy and stability of our device. The cathode voltage of the second section of tube 80 which is an A.-C. signal whose amplitude now depends fairly sharply on the excess of the monitor signal above the pre-set value is then rectified by tube 84 and the resulting D.-C. bias is applied between the grid of the second section of tube 80 and its cathode. This reduces the oscillator plate supply sharply whenever the monitor signal exceeds the pre-set value, thus tending to keep the monitor signal very slightly above this value.

Movement of the slider of the potentiometer 56 changes the magnitude of the monitor signal at which this negative feedback begins, and hence is used to control the RF source output when it is in automatic feedback operation. As noted previously, the potentiometer 54 is used to set the RF source oscillation level when the feedback circuit is disabled by switch 50 and is in manual operation. For simplicity of operation, the potentiometers 54 and 56 are ganged together on a common shaft so that the same knob controls the output under either type of operation. Thus it can be seen that on manual operation the oscillation level is manually set and adjusted for fluctuations in load impedance; whereas in automatic operation the oscillation level is manually set and then is automatically maintained regardless of fluctuations in load impedance.

With respect to the meter amplifier 76, the signal at the plate of the first section of tube 74, which is a sine wave type signal by virtue of the resonant circuit at the input of this tube and is proportional to the oscillator power output as explained previously is applied to the grid of the first section of tube 76. A voltage divider allows the voltage applied at the grid of tube 76 to be varied in three steps thereby changing the scale to be used on the output meter 22. The output of the first section of tube 76 is rectified in the full wave rectifiers 86 and 88. A potentiometer in the plate circuit of the meter amplifier 76 allows setting of the full scale deflection of the meter 22 to agree with the output of the oscillator 20. The second section of tube 76 furnishes an output that can be used with an external output meter.

It will be evident that various other changes, modifications, eliminations, substitutions and additions may be resorted to without departing from the broad spirit and scope of my invention, and hence I do not desire nor intend to limit my invention in all respects to the exact and specific constructions, combinations and subcombinations of the selected example of the disclosure hereof, except as may be required by specific and intended limitations thereto appearing in any of the appended claims.

What is claimed is:

1. A modulator system capable of supporting a constant oscillation comprising an oscillator, two tubes arranged in series with the plate supply of said oscillator, said first tube having a grid to cathode voltage controlled by a feedback signal from a sampling device on a high-frequency transmission line, said second tube having a grid to ground voltage which is a 1000 cycle per second square wave, so that when the square wave signal on said second tube is at its extreme negative excursion said second tube is effectively cut off and no plate current flows to said oscillator and when the square wave signal is at its extreme positive excursion the voltage drop across said second tube is small so that the plate voltage supplied to said oscillator is controlled by the feedback signal which forms the grid to cathode voltage of said first tube.

2. A modulator system capable of supporting constant oscillation comprising, transmission means, oscillator means connected to said transmission means, means to measure the amount of energy passing along said transmission means, control means including vacuum tube grid and cathode means and modulator means connected to said oscillator means in series, means to cause a square wave signal to appear between the grid and ground of said modulator means, means to cause the amount of energy measured on said transmission means to appear as a grid to cathode voltage on said control means and thus to control the plate voltage of said oscillator means when the square wave signal is at one of its extreme excursions.

3. A modulator system capable of supporting constant oscillation comprising, oscillator means, modulator means and control means including vacuum tube grid and cathode means being connected to said oscillator means in series, means to control the grid to cathode voltage across said control means, means to cause a square wave signal to appear between grid and ground of said modulator means, said grid to cathode voltage of said control means controlling that portion of said modulated signal which is applied to said oscillator means.

4. In a system to maintain constant incident power with varying load impedance, said system comprising a transmission means, a high frequency energy source and means to measure the amount of power passing along said transmission means, said high frequency energy source comprising oscillator means, control means including vacuum tube grid and cathode means and modulator means such that said control means and said modulator means are connected to said oscillator means in series, means to cause a square wave signal to appear between the grid and ground of said modulator means, means to cause the amount of energy measured on said transmission means to appear as a grid to cathode voltage on said control means and thus to control the plate voltage of said oscillator means when the square wave signal of said modulator means is at one of its extreme excusions.

5. A square wave modulating circuit comprising vacuum tube modulator means including grid and cathode elements, rectifier means and square wave generating means, said square wave generating means generating a square wave which is applied to the grid of said modulator means, said rectifier means controlling the plate potential of said modulator means whereby the upper edge of the square wave is limited by both the rectifier means and the grid current of said modulator means.

6. A modulator system capable of supporting a constant oscillation comprising an oscillator, two tubes arranged in series with the plate supply of said oscillator, said first tube having a grid to cathode voltage derived from an external manual datum source, said second tube having a grid to ground voltage which is a 1000 cycle per second square wave, so that when the square wave signal on said second tube is at its extreme negative excursion said second tube is effectively cut off and no plate current flows to said oscillator and when the square wave signal is at its extreme positive excursion the voltage drop across said second tube is small so that the plate voltage supplied to said oscillator is controlled by the external manual datum source which forms the grid to cathode voltage of said first tube.

References Cited in the file of this patent

UNITED STATES PATENTS

| | | |
|---|---|---|
| 2,163,670 | Ditcham | June 27, 1939 |
| 2,520,174 | Slattery | Aug. 29, 1950 |
| 2,521,760 | Starr | Sept. 12, 1950 |
| 2,721,977 | Rich | Oct. 25, 1955 |
| 2,786,180 | Cohn | Mar. 19, 1957 |
| 2,843,746 | Hofker | July 15, 1958 |
| 2,887,661 | Brocker | May 19, 1959 |